May 2, 1967  H. R. McKELVIE  3,316,703
BALLOON CONTROL RING
Filed April 21, 1964

INVENTOR:
HENRY R. McKELVIE
BY Robert Brown Jr.
ATTORNEY

United States Patent Office 3,316,703
Patented May 2, 1967

3,316,703
BALLOON CONTROL RING
Henry R. McKelvie, Kings Mountain, N.C.
(P.O. Box 861, Gastonia, N.C. 28052)
Filed Apr. 21, 1964, Ser. No. 361,335
5 Claims. (Cl. 57—106)

This invention relates to improvements in balloon control rings used to limit the amplitude of strand ballooning on spinning, doubling, twisting and similar textile machines. More particularly, the invention relates to an improved balloon control ring.

During operation of machines of the class described, a fiber strand slides around the inside periphery of the control ring at very high velocities. The increasing spindle speeds of modern textile machinery, coupled with the more abrasive fiber strands processed thereby, have introduced difficult friction, wear and vibration problems with respect to conventional control rings which, in turn, have resulted in a high increase in the rate of strand breakage or ends down.

Conventional balloon control rings are formed from wire in annealed condition and then electropolished or otherwise finished so as to possess the desired antifriction properties. Such rings, however, fail to measure up to modern standards of resiliency, resistance to vibration and durability. Moreover, an electropolished stainless steel wire will not retain its finish when formed or shaped into a control ring. Instead, the internal stresses created during the formation will destroy or severely damage the ring finish and thereby accentuate rather than lessen existing friction, wear and vibration problems.

It is therefore an object of this invention to provide a balloon control ring devoid of the aforementioned problems.

It is another object of invention to provide a balloon control ring made from spring or stainless steel and characterized by greater resistance to vibration and by superior antifriction and wear-resistant properties.

It is a further object of invention to provide balloon control rings which are made by first shaping or forming the ring from a drawn spring wire of the required hardness, removing from the outer ring surface the contaminated and severely damaged material resulting from the preceding wire drawing and ring forming steps to thereby expose a roughened but substantially undamaged outer ring surface, and finally electropolishing the roughened outer surface to the desired finish. By adopting this sequence of manufacturing steps, it is possible to avoid the expensive and difficult operation of tempering and hardening the ring after it has been shaped.

It is a still further object of invention to provide balloon control rings made in the manner as set forth in the immediately preceding paragraph wherein the roughened outer ring surface is electropolished by subjecting it first, to a solution which imparts an improved leveling action and then, to a second solution which imparts an improved root mean square, hereinafter referred to as "R.M.S."

Some of the objects of invention having been stated, other objects will appear as the description proceeds when taken in connection with the accompanying drawings, in which.

Figures 1, 2, 2A, 3, 4, 5:
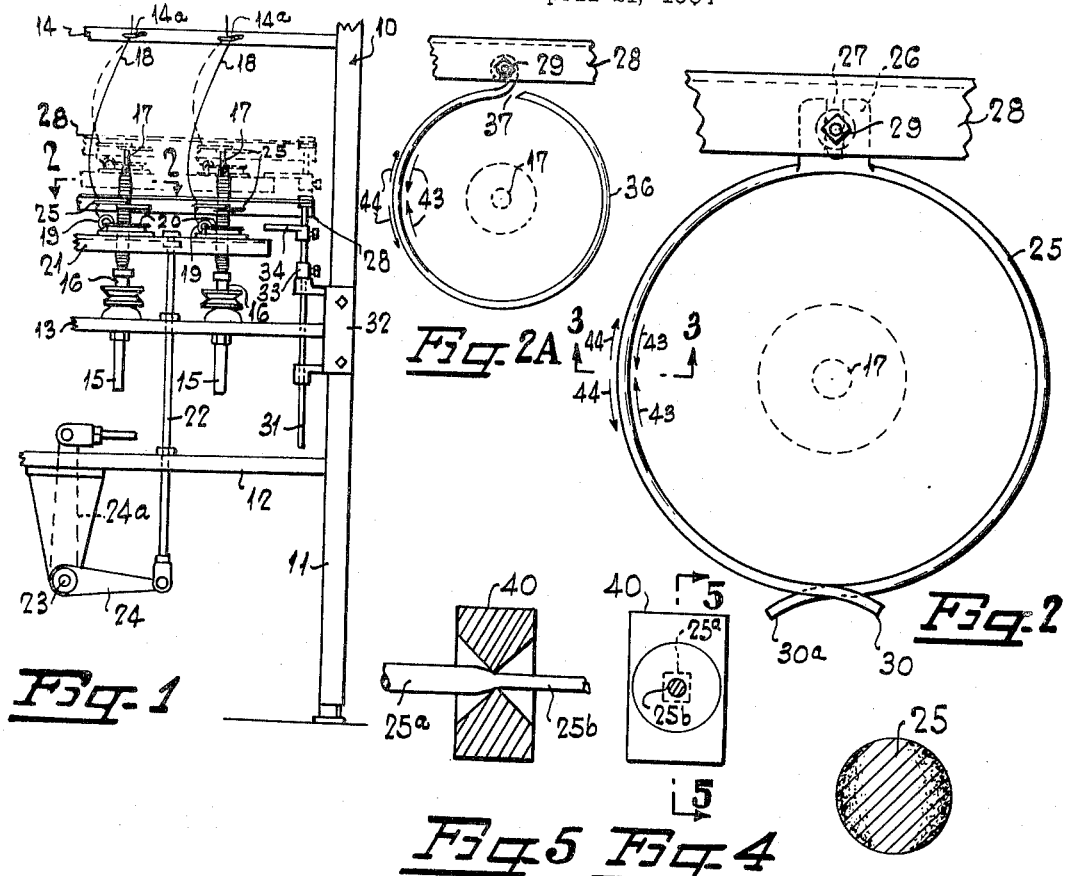
FIGURE 1 is an elevation of one end of a spinning frame showing my improved anti-balloon rings mounted thereon.
FIGURE 2 is an enlarged plan view of the anti-balloon ring and taken along line 2—2 in FIGURE 1.
FIGURE 2A is a view similar to FIGURE 2 but showing a slightly modified form of ring.
FIGURE 3 is an enlarged cross-sectional view of the ring and taken along line 3—3 in FIGURE 2.
FIGURE 4 is a view showing a reduced metallic strand emerging from a die during a conventional metal drawing operation.
FIGURE 5 is a sectional view taken along line 5—5 in FIGURE 4.

Referring more particularly to the drawings, the numeral 10 broadly indicates one end portion of a conventional spinning frame comprising a vertically disposed end support 11 and horizontally disposed rails 12, 13 and 14 extending from the latter. Rail 13 supports a plurality of bolsters 15, each having a rotatable spindle 16 upon which a bobbin or strand holder 17 is removably mounted. During a spinning operation, a textile strand 18 is drawn downwardly from drafting rolls (not shown), through eyelet 14a, underneath ring traveler 19, and onto the holder 17.

The traveler 19 is mounted upon a spinning ring 20 concentrically disposed around the holder 17, said traveler being adapted to slide at high velocities under the influence of strand 18. Rings 20 are mounted in a horizontally disposed ring rail 21 which, in turn, is mounted for vertical reciprocatory movement relative to holders 17 by means of rod 22 slidably mounted in rails 12 and 13. Rod 22 is actuated by means of levers 24 and 24a on shaft 23.

The centrifugal force imparted to strand 18 as it moves at high speeds around the holder 17 causes the strand length between eyelet 14a and traveler 19 to swing outwardly and follow a path substantially defining the surface of a balloon. Heretofore, various types of balloon control rings have been devised to limit the extent of this outward travel of the strand, some of which resemble the shape of the present invention. With the attainment of higher spindle speeds in modern textile machines, however, such conventional control rings have been found deficient in that excessive strand friction, wear and vibration occurs, resulting in correspondingly greater strand breakage or ends down.

I have devised an improved balloon control ring 25 which overcomes the aforementioned problems for the reasons stated and in the manner set forth hereinafter.

Ring 25 is a spirally wound wire with opposite end portions 30 and 30a thereof overlapping one another in spaced relation to permit insertion of the strand, said overlapping portions being disposed at the front of the spinning frame in an easily accessible position.

The rear portion of ring 25 has a lug 26 integral therewith, which lug is provided with slot 27 (FIGURE 2). The ring 25 is adjustably secured to rail 28 by means of the slot 27 and a bolt 29 whereby the ring may be concentrically positioned relative to holder 17.

Horizontal rail 28 and the rings 25 mounted thereon are supported for vertical reciprocatory movement relative to holders 17 by means of rod 31 vertically slidable in bracket 32 secured to end support 11. The rail 28 and rod 31 are shown in lowermost bold-line position in FIGURE 1, at which time an adjustable collar 33 on rod 31 rests upon bracket 32. The dotted line uppermost position of rail 28 occurs at the same time the spinning rail 21 moves to its uppermost dotted line position, the end portion of rail 21 engaging the laterally projecting end of an arm 34 as the rail moves upwardly, said arm being fixedly secured to rod 31.

FIGURE 2A shows another type of control ring 36 which may be attached to rail 28 by means of bolt 29. Ring 36 differs from previously described ring 25 in that all portions thereof lie substantially in the same plane and in the provision of a rearwardly disposed gap or opening 37 for threading the strand rather than a front opening. Rings 25 and 36 are typical of the forms or shapes which may embody the improved properties of the present invention.

In order to overcome the aforementioned problems, the rings 25 and 36 must be made of exceptionally smooth and strong material. The use of spring steel of high tensile strength possesses distinct advantages over annealed steel because (a) spring steel springs back to its original shape when deformed, and (b) spring steel vibrates less under high pitched vibration of modern textile machinery. The rings are preferably made from stainless steel having a minimum tensile strength of 125,000 pounds per square inch. For austenitic 18–8 stainless steel, it is preferable to use full hard drawn material having a tensile strength ranging between 160,000 and 300,000 pounds per square inch. The core hardness should be between 23 and 56 Rockwell "C".

Figure 6:
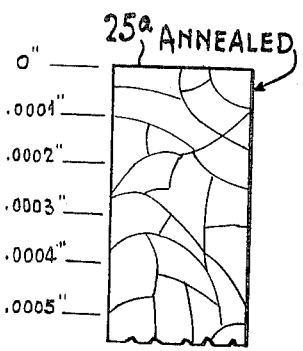
FIGURE 6 is a sectional view schematically representing the outer surface layer of annealed steel.
Figure 7:
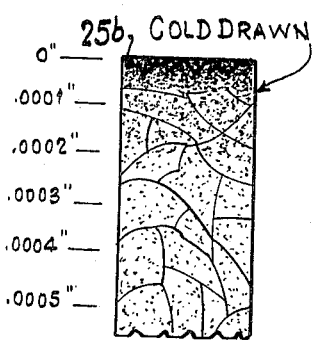
FIGURE 7 is a view schematically representing the outer surface of cold drawn annealed steel and showing the deformation produced by the drawing operation at different depths below the surface.

Specifically, a suitable annealed steel 25a having an outer surface layer such as illustrated in FIGURE 6 may be employed as a starting material. Material 25a is cold drawn one or more times through a metal drawing die 40 (FIGURES 4 and 5) where it is reduced in a well known manner to a strand 25b of smaller cross-section and greater hardness. During the reducing process, internal stresses beyond the elastic limit of the material are built up, especially near the outer surface as indicated at 47 in FIGURE 7. The outer surface is thus severely damaged and the structure of the stainless steel therebelow is changed. It will be noted in FIGURE 7 that the most severely damaged surface is less than .0001″ deep as indicated by the density of shading although the grain size is fragmented to a considerably greater depth, such as by metallic deformation resulting from rotation, slipping, bending, or fragment twinning of the crystals.

The above-described damaged outer surface, together with adjacent contamination, causes erratic anodic corrosion when attempting to electro-polish the ring surface (see J. Wulff, Proceedings of Special Summer Conferences on Friction and Surface Finish, Massachusetts Institute of Technology, 1940, pp. 13–21).

The outer surface of cold drawn wire 25b is further deformed and fragmented when converted into the shape of a balloon control ring, at which time the inside annular concave periphery of the ring is subjected to excessive compressive stresses beyond the elastic limit of the material as indicated by arrows 43. Similarly, the outside annular convex periphery of the ring surface is subjected to excessive tensile stresses as indicated by arrows 44; however, the metallurgical damage to the outer periphery is relatively unimportant since it is not a wearing surface engaged by strand 18. This further damage resulting from the shaping of the wire into a ring is illustrated in FIGURE 3 by stippled shading of the cross-sectional area.

It is important to note that the surface damage resulting from the ring shaping step alone is sufficient to render the ring unsuitable for its intended purpose even if properly finished prior to shaping. By pre-forming or shaping the rings 25 or 36 from an unfinished cold drawn spring wire, rather than a finished wire, the objectionable damage from both the metal drawing and ring shaping steps can be removed in one operation thereby exposing a rough but substantially undamaged outer surface of the proper resiliency and hardness to be electro-polished. Moreover, the ring material can be tempered and hardened more easily when in a strand than when shaped into a ring.

The removal or cleaning of the objectionable damaged outer ring surface may be effected by etching and/or abrasive action. An example of a suitable etching solution is commercial muriatic or hydrochloric acid varying in concentration between the limits of 3 and 30%. The shaped rings are immersed in the solution at about 68 degrees Fahrenheit for periods ranging from 2 to 10 hours, it being understood that the rate of removal varies with the duration of immersion.

Figure 8:
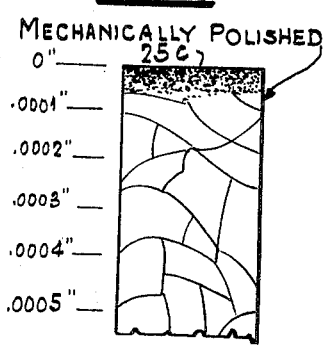
FIGURE 8 is a view similar to FIGURE 7 and showing the deformation produced at different depths of mechanically polished annealed steel.
Figure 9:
FIGURE 9 is a schematic representation of the outer surface of the annealed cold drawn steel when etched to remove the most severely damaged outer surface layer.
Figure 10:
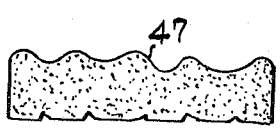
FIGURE 10 is a schematic representation of the surface shown in FIGURE 9 after being electropolished.

The ring may be electro-polished by making it the anode in a suitable solution with current or voltage adjusted to give conditions between etching on one hand and film growth or passivity on the other. The method and solutions in the Faust Patent No. 2,366,712 may be employed for electropolishing the etched or cleaned ring surface; however, the optimum mixtures which are successful in giving best polishing results are limited. I have found as one such solution:

75% phosphoric acid
2 to 4% chromic acid
Voltage: 12 to 25
Current density: 1½ to 6 amperes per sq. in.
Temperature: 80 to 290 degrees Fahrenheit
Time: 5 to 20 minutes A properly cleaned or etched ring, prior to being electro-polished, has an outer surface characterized by roughness, sharp edges and flaws as schematically illustrated in FIGURE 9 by reference character 46. This rough surface may be electropolished in the above solutions to a satin finish produced at temperatures ranging from 80 to 120 degrees Fahrenheit, or to a bright mirror finish produced at temperatures ranging from 120 to 29 degrees Fahrenheit. The electropolishing removes the roughness and produces a smooth wavy surface finish 47 having a low coefficient of friction (FIGURE 10). Surface flaws and waviness are not critical factors as long as the roughness has been removed. More delicate yarns require the bright mirror finish produced at the higher temperature range.

Where the outer surface of the wire from which the control rings 25 and 36 are to be formed is mechanically polished, the metallurgical damage to the outer ring surface is similar to that produced by drawing, although to a lesser depth as indicated at 25c in FIGURE 8.

Likewise, when the mechanically polished wire is shaped into a balloon control ring, further damage will accrue to the outer periphery thereof. The cumulative damage from the mechanical polishing of the wire and from its subsequent formation into a ring can be removed in one operation as previously described to thereby expose a rough but substantially undamaged outer surface to be electropolished.

It has been found that a still better finish can be obtained by using two electropolishing solutions successively to treat shaped rings made from 18–8 stainless austenitic steel or equivalent. These solutions are substantially as given below:

First Solution:
    56% phosphoric acid
    7 to 17% chromic acid
    Voltage: 12 to 25
    Current density: 1½ to 6 amperes per sq. in.
    Temperature: 80 to 200 degrees Fahrenheit
    Time: 5 to 25 minutes
Second Solution:
    75% phosphoric acid
    2 to 4% chromic acid
    Voltage: 12 to 25
    Current density: 1½ to 6 amperes per sq. in.

Temperature: 80 to 290 degrees Fahrenheit
Time: 1 to 5 minutes

The first solution has the advantage of giving better leveling action by decreasing the waviness of the surface; whereas, the second solution gives a better R.M.S. surface finish as a supplement to the first solution. In other words, when using the second solution alone, the waviness causes the R.M.S. reading to irregularly approach 80 to 100 surface finish. When using the two solutions successively, the R.M.S. surface finish can be reduced to 3 or slightly higher.

What I claim as new and desire to secure by Letters Patent of the United States is:

I claim:

1. A balloon control ring for controlling ballooning of textile strands comprised essentially of electro-polished spring wire, said ring having a concave wearing surface and wherein the particles forming said surface are subjected to compressive stress below the elastic limit thereof.

2. A balloon control ring for controlling ballooning of textile strands comprised essentially of electro-polished spring stainless steel wire, said ring having a concave wearing surface and wherein the particles forming said surface are subjected to compressive stress below the elastic limit thereof.

3. A balloon control ring for controlling ballooning of textile strands comprised essentially of an electro-polished spring wire having a Rockwell "C" hardness ranging between 23 and 56, said ring having a concave wearing surface and wherein the particles forming said surface are subjected to compressive stress below the elastic limit thereof.

4. A balloon control ring for controlling ballooning of textile strands comprised essentially of an electro-polished stainless steel wire having a hardness core ranging between 23 and 56 Rockwell "C" and a minimum tensile strength of about 125,000 pounds per square inch, said ring having a concave wearing surface and wherein the particles forming said surface are subjected to compressive stress below the elastic limit thereof.

5. A balloon control ring for controlling ballooning of textile strands comprised essentially of a hard drawn metal core having a tensile strength ranging between 160,000 and 300,000 pounds per square inch, and a hardness ranging between 23 and 56 Rockwell "C," said ring having a concave wearing surface and wherein the particles forming said surface are subjected to compressive stress below the elastic limit thereof, said surface being electro-polished and having a finish ranging between 3 and 100 root mean square.

References Cited by the Examiner

UNITED STATES PATENTS

| | | | |
|---|---|---|---|
| 2,660,856 | 9/1949 | Kingsbury | 57—106 XR |
| 2,970,425 | 2/1961 | Foard | 57—119 |
| 2,987,871 | 6/1961 | Foard | 57—120 |
| 3,032,961 | 5/1962 | Delesalle | 57—106 X |
| 3,065,592 | 11/1962 | Kresslein | 57—106 X |
| 3,083,931 | 4/1963 | Dechene | 57—106 X |
| 3,088,889 | 5/1963 | La Boda et al. | 204—143 |
| 3,095,688 | 7/1963 | Russell | 57—106 |
| 3,202,589 | 8/1965 | Bride | 204—140.5 X |
| 3,213,008 | 10/1965 | Valetin | 204—140.5 |
| 3,226,924 | 1/1966 | Dalpiaz | 57—125 |

OTHER REFERENCES

Mechanical Engineers Handbook, Fifth ed. McGraw-Hill Book Company 1951, pp. 397, 410, 559 and 560.

FRANK J. COHEN, Primary Examiner.

D. E. WATKINS, Assistant Examiner.